United States Patent [19]

Patterson et al.

[11] Patent Number: 5,675,487
[45] Date of Patent: Oct. 7, 1997

[54] SYSTEM FOR CONTROLLING ENERGY THROUGH WINDOW

[75] Inventors: James R. Patterson; Greg R. Luecke, both of Ames, Iowa

[73] Assignee: Iowa State University Research Foundation, Inc., Ames, Iowa

[21] Appl. No.: 468,806

[22] Filed: Jun. 6, 1995

[51] Int. Cl.$^6$ .......................... G05B 19/18; E05F 15/20
[52] U.S. Cl. .................. 364/167.01; 359/592; 359/596; 160/7
[58] Field of Search .................... 364/167.01; 160/7, 160/168.1, 176.1; 318/16, 17; 359/591, 592, 596

[56] References Cited

U.S. PATENT DOCUMENTS

| | | | |
|---|---|---|---|
| 4,536,847 | 8/1985 | Erickson et al. | 364/516 |
| 5,134,347 | 7/1992 | Koleda | 318/16 |
| 5,285,315 | 2/1994 | Stiles | 359/592 |
| 5,413,161 | 5/1995 | Corazzini | 160/7 |
| 5,495,153 | 2/1996 | Domel et al. | 318/17 |

OTHER PUBLICATIONS

Developing Integrated Envelope and Lighting Systems for Commercial Buildings; Solar '94, Golden Opp. for Solar Prosp., Am. Solar Energy Soc., Inc., Jun. 25–30, pp. 1–6.
Quantifying Energy Savings of an Active, Smart Window; paper by Arvid E. Osterberg, 6 pages.
Experimental Study of Thermal Performance of Automated Venetian Blind Window Systems; Solar Energy vol. 52, No. 1, pp. 3–7, 1994, E. Bilgen.
Heat Transfer Analysis in an Automated Ventian Blind Window System; J. of Solar Energy Engineering, vol. 111, Feb. 1989, pp. 89–95, S. Rheault, et al.

*Primary Examiner*—Paul P. Gordon
*Attorney, Agent, or Firm*—Edward J. Timmer

[57] ABSTRACT

Energy control system for a window comprises fenestration blinds, horizontal or vertical, disposed at the window and adjustable in angle to control solar radiation entering the window. First and second photovoltaic sensors are disposed proximate respective exterior and interior sides of the fenestration blinds for providing a signal representative of incident solar radiation at the respective exterior and interior sides. An electrical motor is can be disposed proximate the window and is operably connected to the fenestration blinds in a manner to controll the angle thereof. A microprocessor control device is provided for providing control signals to the motor to adjust the angle of the fenestration blinds. In a summer mode of operation, the microprocessor compares a ratio of the signals representative of solar radiation incident at the exterior and interior sides in response to adjustment of the angle and a preset ratio stored in the microprocessor representative of minimum direct light and maximum indirect light entering the window and continiues to provide control signals to the motor to adjust the angle until the ratio of the signals approximates the preset ratio. In the winter mode of operation, the microprocessor compares a signal representative of solar radiation incident on the second, inner photovoltaic sensor only in response to adjustment of the fenestration angle and a preset signal representative of maximum direct light entering the window (where the fenestration angle is generally equal to the solar zenith angle) and continues to provide control signals to the motor until the signal approximates the preset signal.

30 Claims, 10 Drawing Sheets

```
//Program to control the motion of the          if (mode.2==1 || check <= shade ) {           check=*ADRES;
window                                          //OPEN                                         if (check<= shade || mode.1 !=    #asm
                                                    GET_CH2O;                                  1) {                              MOVLW 0B00001111
#include "picreg.equ"                               ir=*ADRES;                                     return;                       MOVWF Port_B
#pragma has PIC14;                                  if (ir<irchk) {                            }                                 TRIS Port_B
                                                        MOVB(1);                               if (((dv < THRES1) && ((0-        BSF STATUS,5
#asm                                                }                                          dv) < THRES1)) {                  MOVLW 0b0000000
  ADGO   equ   2                                    else {MOVB(0);}                                mode=*Port_B;                 MOVWF ADCON1&&0x7F
#endasm                                             DELAY(0);                                      goto UPDATE;                  BCF  STATUS,5
                                                                                               }                                 MOVLW 0b11000001
void DELAY(unsigned int n);                     goto MODE;                                     vold=vnew;                        MOVWF ADCON0
void SETUP();                                   }                                                                                CLRF INTCON
void MOVB(int direction);                                                                      return;                           BSF  INTCON,ADIE
void MOVE2();                                   if (mode.0==1) {                               }                                 #endasm
void SUMMER();                                      SUMMER();                                                                    return;
void WINTER();                                  }                                          void SUMMER() {                       }
void GET_CH0();//outside sensor                 if (mode.1==1) {                               GET_CH0();
void GET_CH1();//inside sensor                      WINTER();                                  GET_AD();                         void GET_AD() {
void GET_AD();                                  }                                              outside= *ADRES;                  #asm
void GET_CH2();//IR sensor                                                                     //outside is channel 0                BCF  ADCON0,ADIF
void GET_CH3();// 1/3 unregulated               goto MODE;                                     GET_CH1();                            BSF  ADCON0,ADGO
voltage                                         }                                              GET_AD();                             return
                                                                                               inside= *ADRES;   //inside
unsigned long outside,dv1,ratio,ratio1;         void WINTER() {                                is channel 1                      #endasm
unsigned int ir,irchk, inside,dv,vold,              GET_CH1();                                 outside= outside*100;             }
vnew, check, nite, shade;                           GET_AD();                                  dv1= outside / inside;
int times,Dir,THRES1,THRES2;                        vold=*ADRES;                               if (dv1 > ratio1) {               void GET_CH0() {
bits mode;                                          while (mode.1 ==1 && check >                   MOVE(1);  //opens             #asm
                                                shade) {                                       the blinds                            MOVLW 0b11000001
void main() {                                   LOOP:                                              DELAY(2);                         MOVWF  ADCON0
  THRES1=1;                                         mode=*Port_B;                                  return;                           CLRF INTCON
  THRES2=1;                                         if (mode.1!=1) {                           }                                     BSF  INTCON,ADIE
  vold=0;                                           return;                                    MOVB(0); // closes the            #endasm
  Dir=1;                                            }                                          blinds                            return;
  nite=5;                                           MOVB(Dir);                                     DELAY(2);                     }
  check=17;    // signal to close at night          DELAY(0);                                  return;
  ratio=350;   //natural light                     GET_CH1();                                  }                                 void GET_CH1() {
```

FIG. 7A

```
ratio1=350;
irchk=100;    // infrared value for full open
shade=40;     // indirect light on window

SETUP();

MODE:
    Dir = 1;
    mode=*Port_B;

GET_CH3();
    GET_AD();
    check=*ADRES; // voltage divider if (check < nite ) {
        MOVE2();
        DELAY(250);
        DELAY(250);
        DELAY(250);
        DELAY(250);
        goto MODE;
    } if (mode.3==1) {           //CLOSE
        MOVE(0);
        DELAY(0);
        Dir=1;
        goto MODE;
    }

UPDATE:
    GET_CH1();
    GET_AD();
    times=0;
    vnew=*ADRES;
    dv= vold - vnew;
    GET_CH0();
    GET_AD();
    check = *ADRES;
```

```
                    GET_AD();
                    vnew=*ADRES;
                    dv= vold - vnew;
                    GET_CH0();
                    GET_AD();
                    check=*ADRES;
                    if (check<= shade) {
                        return;
                    }
                    if ((dv < THRES2) && ((0 - dv) < THRES2)) {
                        goto LOOP;
                    }
                    times += 1;
                    vold=vnew;
                    if ((dv & 0x80) < 0) {
                        goto LOOP;
                    } if (times==1) {
                        if (Dir==1) {
                            Dir=0;
                        }
                        else {
                            Dir=1;
                        }
                        goto LOOP;
                    }
```

```
void MOVE(int direction) {
    if (direction==1) {          // opens the blind
        *Port_B=0b10000000;
    }
    if (direction==0) {          // closes the blind
        *Port_B=0b00010000;
    }
    NOP;
    NOP;
    NOP;
    NOP;
    NOP;
} void MOVE2() {
    *Port_B=0b00010000;
    DELAY(250);
    *Port_B=0b00000000;
    return;
} void DELAY(unsigned int n) {
    unsigned int i;
    for (i=0; i<=n; i++) {
    }
    return;
} void SETUP() {
```

```
#asm
    MOVLW  0b11001001
    MOVWF  ADCON0
    CLRF   INTCON
    BSF    INTCON,ADIE
#endasm
    return;
} void GET_CH2() {
asm
    MOVLW  0b00100000
    MOVWF  Port_B
    MOVLW  0b11001001
    MOVWF  ADCON0
    CLRF   INTCON
    BSF    INTCON,ADIE
    BCF    ADCON0,ADIF
    BSF    ADCON0,ADGO
    MOVLW  0b00000000
    MOVWF  Port_B
#endasm
    return;
} void GET_CH3() {
asm
    MOVLW  0b11001001
    MOVWF  ADCON0
    CLRF   INTCON
    BSF    INTCON,ADIE
#endasm
    return;
}
```

CHAMBER A, NO BLIND
CHAMBER B AUTOMATED BLIND
ORIENTATION WEST

FIG. 9

CHAMBER A, NO BLIND
CHAMBER B AUTOMATED BLIND
ORIENTED SOUTHEAST

FIG. 10

CHAMBER A, BLIND WITH SLATS IN A FIXED HORIZONTAL POSITION
CHAMBER B, AUTOMATED BLIND
ORIENTATION WEST

SYSTEM FOR CONTROLLING ENERGY THROUGH WINDOW

FIELD OF THE INVENTION

The present invention relates to energy control system for a window that uses solar radiation as the control parameter and as the power source for automatic adjustment of adjustable window treatments, such as horizontal or vertical blinds or other slatted and non-slatted fenestration shade devices to control solar energy entering a structure through the window.

BACKGROUND OF THE INVENTION

According to recent studies by the U.S. Department of Energy National Laboratories, more than 30 percent of the energy used in buildings is attributable to windows and lighting. Solar gain and heat loss through glazing systems accounts for a substantial amount of that energy. Rudimentary technolgies necessary to enable the design and application of intelligent fenestration systems (i.e. automated active decision making) for buildings are in existence.

For example, "active" window technology controls thermal transmittance through building fenestration by automatically adjusting shading devices to accept or reject direct solar gain as neeeded. However, since the environment variables (direct sun, no sun, diffuse light, intermittent clouds, etc.) are extensive and generally unpredictable, active or automatic window control devices must be able to make routine intelligent decisions in order to provide effective control. Most attempts heretofore at developing "active" window controllers have involved a large number of complex variables such as outside/inside temperature monitoring, light level monitoring, and so forth. The complexities of the resulting control system have often been self-defeating and, it has been difficult to obtain satisfactory results on a day-to-day basis. The energy savings (and consequently monetary savings) represented by "active" window control are relatively small and not supportive of costly complex, control systems.

A practical "active" window controller therefore needs to be inexpensive, reliable, and continuouslly on-line automatically adjusting shading coefficients. The control device should be able to optimize the lighting and solar gain that comes through a window. Local climate conditions, and most HVAC (heating, ventilating, and air conditioning) control strategies, which are either heating or cooling, dictate that this optimization has two basic modes; one mode for winter and one for summer. Moreover, the window also should be closed off by blinds at night for privacy and reduction of radiant heat losses. In winter, direct beam radiation can be used to reduce the heating load of a building and maximize natural lighting. In summer, direct beam radiation should be blocked; however, as much diffuse light and reflected light should be allowed in the building as possible in order to reduce the lighting load. These modes of operation should reduce the building envelope energy requirements while maintaining occupant comfort.

An object of the present invention is to provide an energy control system for a window that provides such a winter mode and summer mode of operation effective to control solar energy entering a building or structure.

Another object of the present invention is to provide a window energy control system having reduced complexity and cost.

SUMMARY OF THE INVENTION

The present invention provides an energy control system for use with a window having fenestration shade means, such as conventional horizontal or vertical blinds, the angle of which is adjustable between an open position to a closed position to control solar radiation entering the window. In one embodiment of the present invention providing a summer mode and winter mode of operation, the energy control system includes first and second light sensors (e.g. first and second photovoltaic sensors) disposed proximate respective exterior and interior sides of the fenestration shade means for providing a signal representative of incident solar radiation at the respective exterior and interior sides.

An electrical motor is operably connected to the fenestration shade means in a manner to control the aforementioned angle thereof between open and closed positions. A microprocessor control device provides control signals to the electrical motor to adjust the angle of the fenestration shade means. In a summer mode of operation, the microprocessor control device compares 1) a ratio of the signals representative of solar radiation incident at the exterior and interior sides in response to adjustment of the fenestration shade angle and 2) a preset ratio stored in the microprocessor representative of minimum direct light and maximum indirect light entering the window and continues to provide control signals to the electrical motor to adjust the fenestration shade angle until the ratio of the signals approximates the preset ratio.

In the winter mode of operation, the microprocessor control device compares 1) a signal representative of solar radiation incidient at the interior side of the window in response to adjustment of the fenestration shade angle and 2) a preset signal stored in the microprocessor representative of maximum direct light entering the window (where the fenestration shade angle is generally equal to the solar zenith angle) and continues to provide control signals to the electrical motor until the signal approximates the preset signal. In this way, the fenestration shade angle is maintained generally equal to the solar zenith angle and permits the maximum influx of direct beam radiation through the window during the winter mode.

One embodiment of the energy control system can further include a current regulated photovoltaic power supply disposed proximate the exterior side of the fenestration shade means for supplying electrical power to the microprocessor control device and a separate, unregulated photovoltaic power supply similarly disposed for supplying electrical power to the electrical motor. The unregulated photovoltaic power supply charges a capacitor and in certain installations, a battery pack, that supplies electrical power to the electrical motor as needed to incrementally vary the fenestration shade angle.

Under conditions of low light, such as present in the early morning or late evening, a lower threhold value for the voltage on the current regulated photovoltaic power supply is reached. In response, the microprocessor control device commands the electrical motor to close the fenestration shade means. Thus, the fenestration shade means remains closed during the night to provide privacy, security, and reduce radiative heat loss during the winter. The fenestration shade means can also be manually opened or closed, however.

In a particular embodiment of the invention, a first photovoltaic sensor is disposed on the outer pane of a double-pane window, while a second photovoltaic sensor is disposed on the inner pane of the window. The electrical motor is disposed between the outer and inner panes of the window and is operably connected by a gear reducer to the fenestration means so as to vary the angle thereof. The motor can be a stepping motor so as to vary the angle in increments. A rotational sensor is provided to provide a reference signal to the microprocessor control device representative of a full open position of the fenestration shade means.

The invention will be described in more detail by the following drawings taken with the following detailed description.

DETAILED DESCRIPTION OF THE INVENTION

Figure 1:
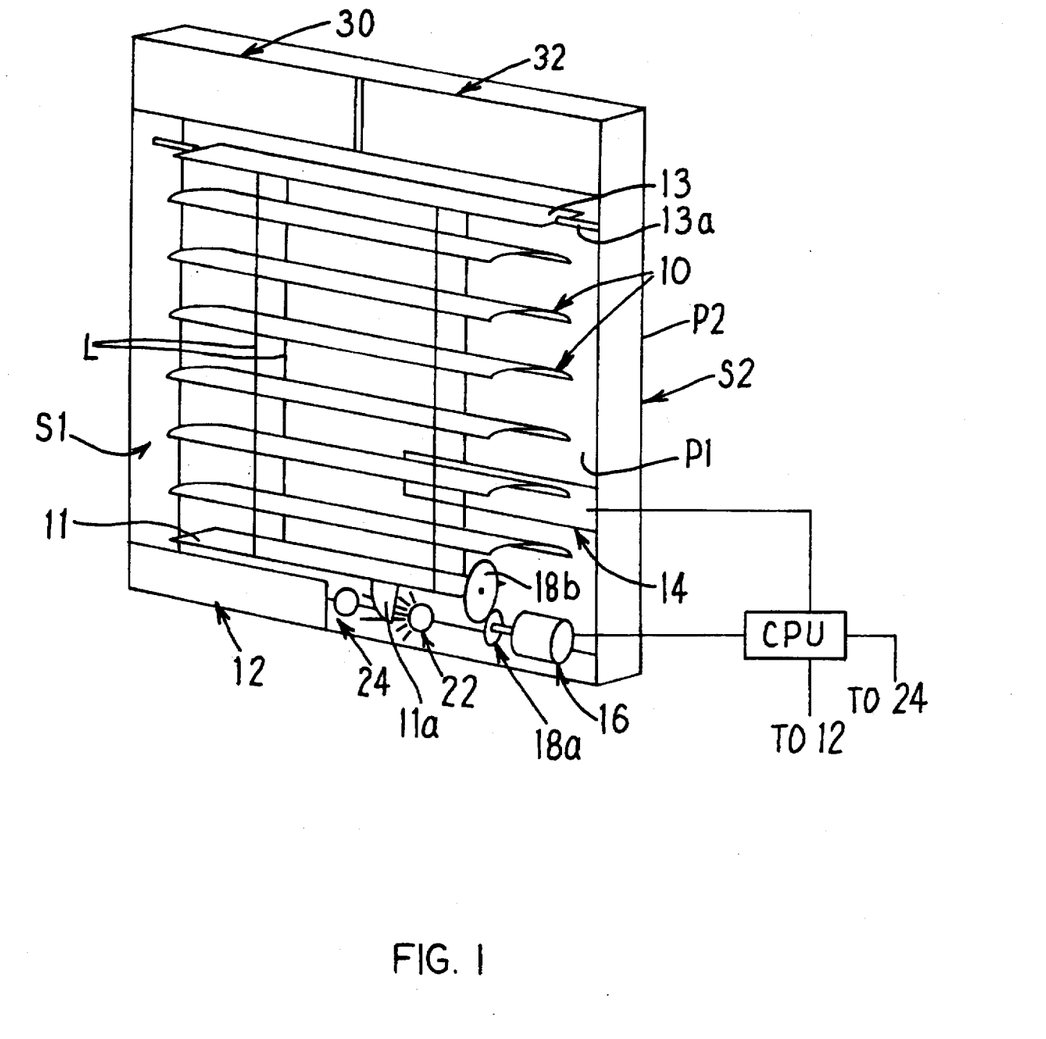
FIG. 1 is a schematic perspective view of a self-contained sensing and actuation window energy control system in accordance with an embodiment of the present invention for controlling solar energy through a window.

Referring to FIG. 1, a self-powered sensing and actuating energy control system for a window is shown for purposes of illustrating and not limiting the present invention. The energy control system shown in FIG. 1 is operable in a summer mode and a winter mode and uses visible solar radiation as the power source and as the control parameter for automatic control of adjustable fenestration shade means, such as the conventional horizontal, slatted blinds 10 that control solar radiation entering the building through the window. The invention is not limited for use with the horizontal, slatted blinds 10 and can be practiced with vertical, slatted blinds and other slatted or non-slatted types of fenestration shade means that are angularly adjustable between open and closed positions to control solar radiation entering the window, which can be a double or multi-glass pane window or a single glass pane window.

The energy control system of FIG. 1 employs sensing electronics, microprocessor control, and actuation motor function that actively and automatically controls the amount of direct beam solar radiation which enters the building through the window by adjusting the window shading coefficient using the adjustable slatted fenestration blinds 10. The window sensing and control system is adapted to provide accurate operation for any window installation orientation and geographical location. The window energy control system of FIG. 1 is powered by solar energy and thus is a self-powered and self-contained system so as to permit independent installation and operation at each window separate from other like energy control systems installed at other windows.

The energy control system of FIG. 1 includes first and second light sensors 12, 14, such as photovoltaic sensors, disposed proximate respective exterior and interior sides S1, S2 of the fenestration blinds 10. The sensor 12 is mounted by clear, transparent adhesive or tape on the inner surface of the outer glass pane P1 of the window and faces outwardly to sense incoming, incident light on the outer side of the fenestration blinds 10 and provide an analog input signal to a microprocessor control device CPU. The sensor 14 is similarly mounted on the inner surface of the inner glass pane P2 of the window and faces outwardly to sense incoming, incident light on the inner side of the fenestration shades or blinds 10 and provide another analog input signal to the microprocessor control device CPU. The sensors 12, 14 each provide analog signals representative of incident solar radiation at the respective exterior and interior sides S1, S2 of the fenestration shades or blinds 10.

Photovoltaic sensors 12, 14 available from Iowa Thin Films, Inc. Ames, Iowa, can be used in practicing the present invention and have the following characteristics: Sensor modules:

flexible polymer based solar modules using thin film a-Si with two separate submodules having nominal electrical parameters at AM 1 for submodules:
Power Point: 25 mA at 5 V
$V_{oc}$=8.6 V
$I_{sc}$=31 mA
Nominal package size: ¾ inch by 10 inches by 4 mils thick
Lead Outs: Tinned copper busbar (solderable)

An electrical motor 16 is operably connected to the fenestration blinds 10 to adjust the fenestration angle thereof. In particular, the electrical motor 16 comprises a small, reversible DC permanent magnet motor rated for operation between 6 to 12 volts, with a no-load speed 7000 rpm and a stall torque of 1.0 oz.-in. with 12 volts applied. A FK-180-SH-10300 model motor from Mabuchi Motors America Corp., 475 Park Ave. South, New York, N.Y., can be used.

The electrical motor 16 preferably is disposed between the outer and inner panes P1, P2 of the window, although the motor can be located at other positions so long as there is a drive connection between the motor and one or more of the fenestration shades or blinds 10 such that the angle of the blinds 10 can be varied to control solar radiation entering the window. In FIG. 1, the electrical motor 16 is operably connected to a horizontal stiffened bottom rail 11 of the fenestration blinds 10 so as to rotate the rail 11 in angular increments, although the motor just as well can be connected to the upper stiffened rail 13 mounted on shaft 13a. Rotation of the bottom rail 11 will cause rotation of all the blinds in unison as a result of the blinds being interconnected by standard venitian blind vertical tenison lines L and lands (not shown) in conventional manner.

In particular, the electrical motor 16 drives a set of reduction gears 18a, 18b having a ratio of 300:1 between the motor and the rail 11 so as to allow full motion of the blinds 10 between closed to open positions in approximately 2 seconds. A rotational sensor is associated with the bottom rail 11 to provide a reference signal representative of an absolute shade angle where the blinds 10 are in the full open position. To this end, a mechanical tab 11a is provided on the bottom rail 11 and is used to interrupt a light beam sent by a light emitting diode 22 and received by a photodetector 24. The mechanical tab 11a is adjusted to interrupt the light beam just when the blinds 10 are in a horizontal position corresponding to the open blind position. The reference signal from the rotational sensor is sent to a microprocessor control device CPU described below for position sensing.

Figure 2:
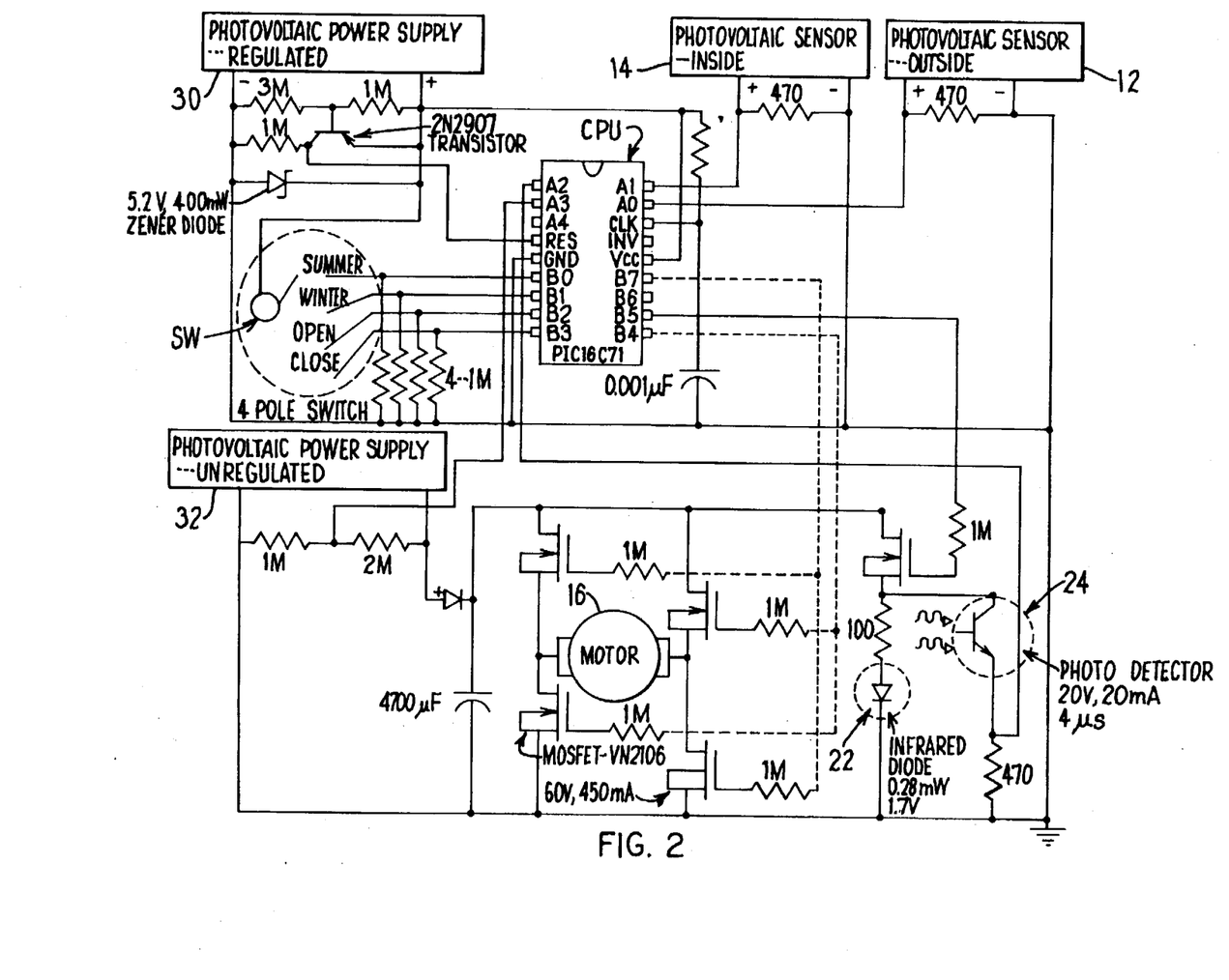
FIG. 2 is a schematic diagram of the electrical components of the window energy control system of FIG. 1.

Control signals for the electrical motor 16 are provided by the microprocessor control device CPU which can comprise a Microchip PIC16C71 microprocessor having a built-in analog-to-digital conversion capability (converter), comparator, and eight-bit output port and available commercially from Microchip, Inc., 2355 W. Chandler Rd., Chandler, Ariz. 85224-9968. The analog-to-digital converter allows incident solar radiation at sensors 12, 14 to be measured in analog signal volts and a manual mode selection between the summer and winter modes of operation as described below. The output ports B7 and B4 of the microprocessor, FIG. 2, are used to command the electrical motor 16 so as to adjust the fenestration angle of the blinds 10.

Electrical power is supplied to the microprocessor control device CPU and electrical motor 16 separately using first and second photovoltaic power supplies 30, 32 mounted by clear, transparent adhesive or tape on the inner (or outer) surface of the outer glass pane P1 of the window exterior of the fenestration blinds 10 so as to face outwardly to receive incoming, incident sunlight. The photovoltaic power supply 30 is regulated by a zener diode to provide a regulated voltage of 4–7 volts DC to supply a minimum regulated current of 2.5 mA to the microprocessor control device CPU at terminal $V_{cc}$. This small but steady current level is required even in very low light levels. Voltage from the other photovoltaic power supply 32 is unregulated and supplies current to drive the electrical motor 16 via a capacitor 34, FIG. 2. The capacitor 34 is charged by the power supply 32, and the stored charge is used to drive the motor 16 in small steps. In this way, relatively high instantaneous demand from the motor 16 is met by slowly collecting current over a large period of time and using it on an as-needed basis to drive the motor.

Photovoltaic power supplies 30, 32 available from Iowa Thin Films, Inc. Ames, Iowa, can be used in practicing the present invention and have the following characteristics:

Sensor modules:

flexible polymer based solar modules using thin film a-Si with two separate submodules having nominal electrical parameters at AM 1 for submodules:
Power Point: 50 mA at 12 V
$V_{oc}$=20 V
$I_{sc}$=62 mA
Nominal package size: 3¾ inch by 21.5 inches by 4 mils thick Lead Outs: Tinned copper busbar (solderable)

The energy control system of FIG. 1 can be operated in a summer mode or a winter mode by manual actuation of a switch SW shown in FIG. 2 which illustrates the schematic circuit diagram for the power, sensing, and control circuit components used with the microprocessor control device CPU. The switch SW is movable to a Summer position and Winter position to this end.

Referring to FIG. 2, the 4-pole switch SW allows the selection of the summer mode or winter mode and manual opening or closing of the blinds or shades 10. The four 1M ohm resistors on the switch lines (to microprocessor pins "B0, B1, B2, B3") are pull-down resistors to assure zero voltage when the circuit is open.

The transistor/resistor circuit (transistor 2N2907 and 3M resistor/two 1M resistors) connected to the lead lines of the regulated photovoltaic power supply provides a "high" signal to the microprocessor reset pin ("RES") only if the regulated voltage is higher than 2.6 volts. This prevents the microprocessor control device CPU from initializing into an unexpected state due to the slow rise of the voltage in the early morning. The zener diode (5.2 V, 400 mW) connected across the regulated photovoltaic power supply limits the maximum microprocessor voltage to 5.2 volts. The 1M ohm/0.001 microFarad RC (resistor/capacitor) network attached to the microprocessor pin "CLK" provides the clock frequency to the microprocessor control device.

The two 470 ohm resistors connected across the photovoltaic sensors provide a load that results in a linear relationship between the incident light on the respective sensor and the output voltage of the sensor.

The 1M ohm and 2M ohm resistors across the unregulated photovoltaic power supply provide a voltage divider that assures the voltage measured by the microprocessor pin A3 does not exceed the regulated supply level. The diode on the positive unregulated voltage line assures that current can only flow to charge the storage capacitor and prevents the photovoltaic power supply from discharging the capacitor in low light levels. The 4700 microFarad capacitor stores energy for moving the motor.

The network of four MOFSETS on the motor provides current to turn the motor in both clockwise and counterclockwise directions, and depending on which of microprocessor pins "B4" or "B7" is high. The MOFSET connected to pin "B5" controls power to the aforementioned optical position sensor. The four 1M resistors connected to the gates of the MOFSETS assures a high impedance to the microprocessor control device CPU.

The infrared diode 22 (0.28 mW, 1.7 V) sends light to the photo detector 24. The 100 ohm resistor connected to the infrared diode 22 limits the current that can pass through the diode. The photodetector 24 supplies a high voltage to microprocessor pin "A2" if the infrared diode 22 has a clear line of sight, or a low voltage if the line of sight is blocked by the mechanical tab 11a. The 470 ohm resistor connected to the photodetector 24 is a pull-down resistor to assure low voltage when the photodetector is not energized.

Figure 2A:
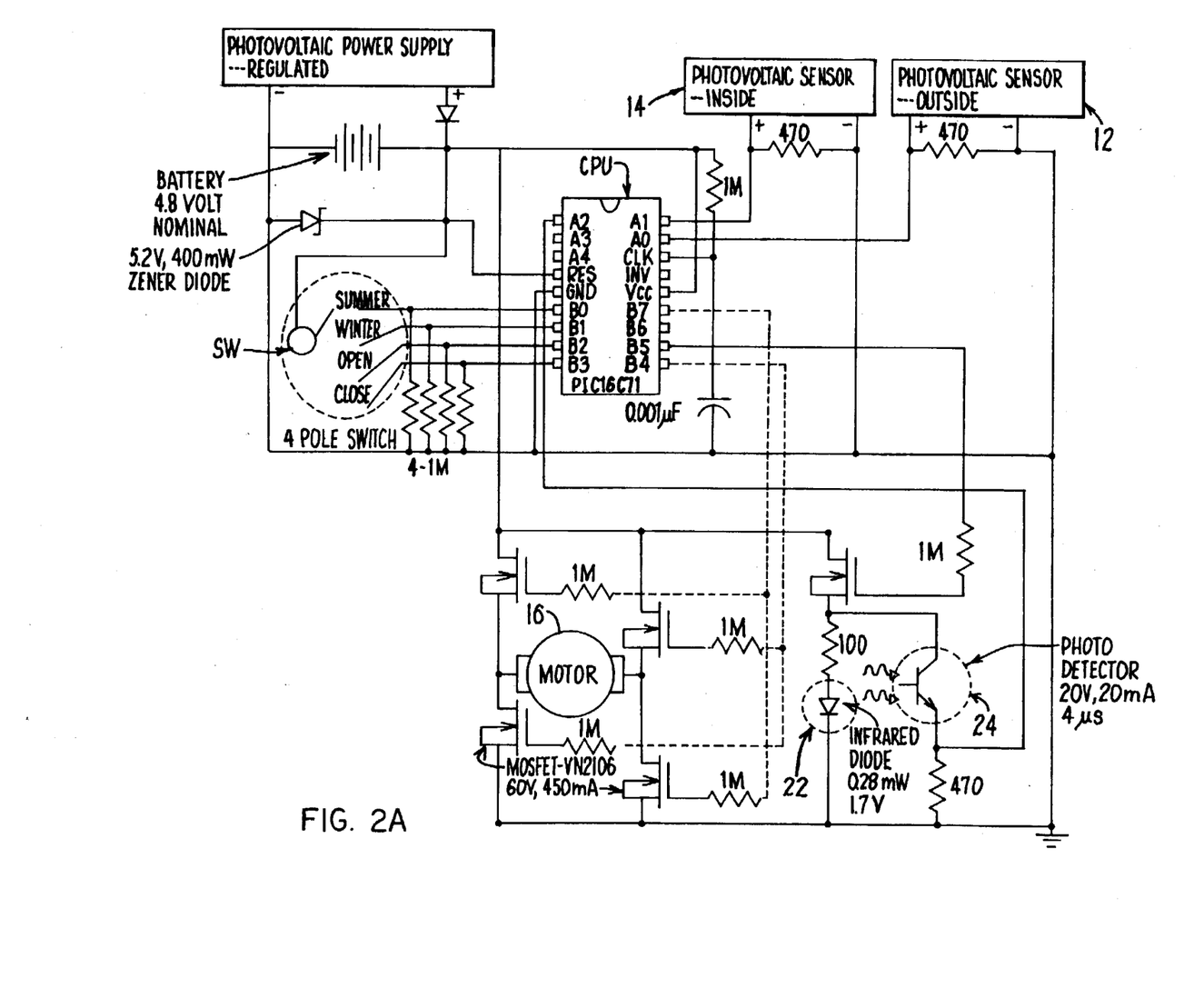
FIG. 2a is a schematic diagram of the electrical components of the window energy control suystem of FIG. 1 when a battery pack is employed in place of the capacitor as the energy storge element.

Referring to FIG. 2a, an alternate circuit using a battery pack "battery" (e.g. 4.8 volts, 180 milliAmp hour battery pack) trickle charged to store energy for both the microprocessor control device CPU and to drive the motor 16 (in lieu of the aforementioned storage capacitor) is illustrated. The circuit otherwise includes similar components and functions in similar manner as that of FIG. 2. In this embodiment, the unregulated power supply 32 can be eliminated.

The microprocessor control device CPU provides control of the fenestration blinds 10 based on two modes of operation: 1) full admittance of direct solar energy and 2) complete eclipse of the direct solar energy. These modes are generally associated with cold and warm weather building heating/cooling modes.

Figure 3:
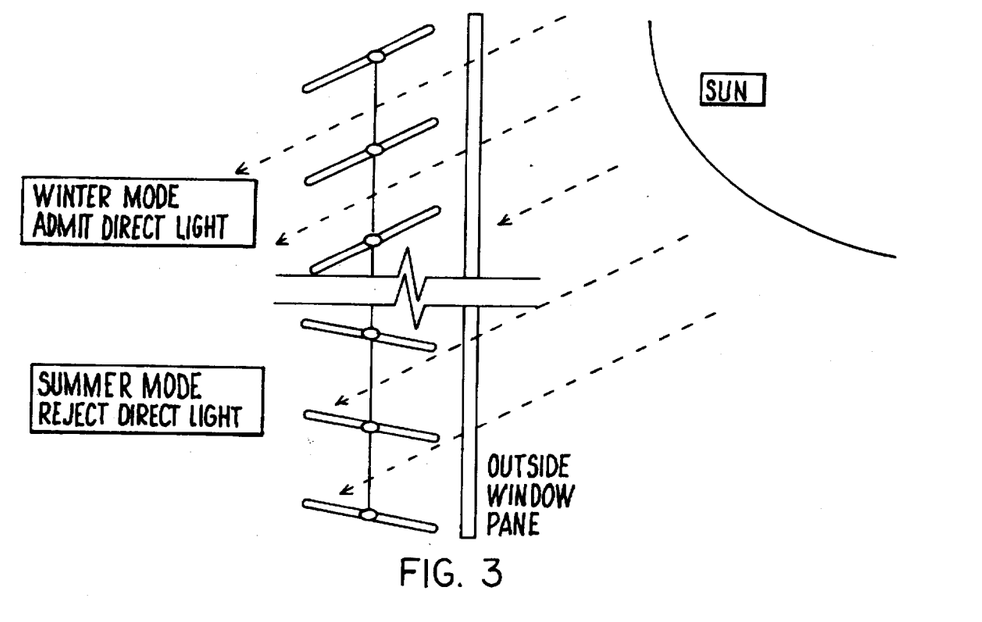
FIG. 3 is a schematic illustration of the control modes of the window energy control systemn of FIG. 1.

During the winter mode, while the building is heated, all direct beam solar radiation is allowed to enter the building through the window, reducing the heating load while maximizing the amount of natural light entering the window. During the summer mode, while the building is being cooled, the blinds 10 are adjusted to be open as far as possible while just blocking the direct beam solar radiation. This mode reduces the cooling load on the building while admitting a maximum of diffuse and ground-reflected light for interior lighting purposes. Maximizing the amount of admitted daylight in this mode further reduces building energy loads by reducing the amounts of electricity required for interior lighting. The shade or blind angles corresponding to these two modes of operation are shown in FIG. 3. As mentioned, the mechanical switch SW in FIG. 2 allows manual selection of one of the summer or winter modes. In addition, manual settings, "open" and "close" in FIG. 2, are provided to allow room occupants to manually open or close the automatic blinds 10.

Automatic operation of the energy control system of FIG. 1 begins when the light levels incident on the photovoltaic power supplies 30, 32 are bright enough to provide power to both the microprocessor control device CPU and the electrical motor 16.

The control algorithm for automatic operation of the energy control system is based on the response of the first and second light (photovoltaic) sensors 12, 14 wherein their power output is proportional to the amount of light incident on the sensors 12, 14.

Figure 4:
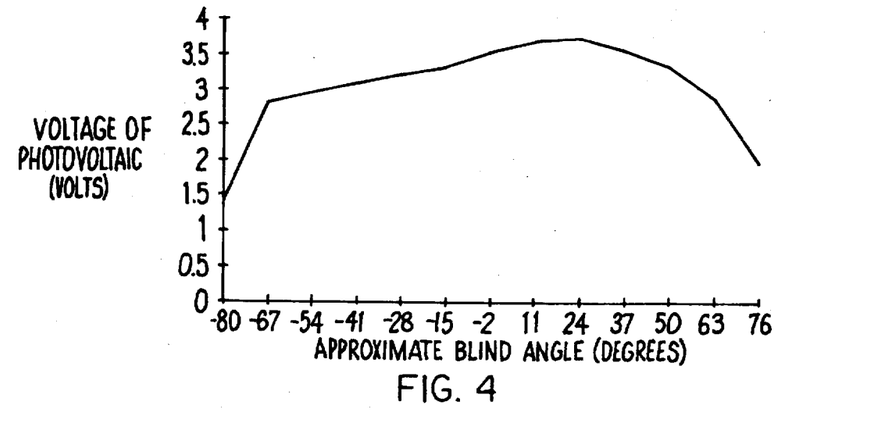
FIG. 4 is a graph of photovoltaic voltage versus window blind angle.

In particular, the voltage output of the sensor 14 on the inner pane P2 of window inside the fenestration blinds 10 is a function of the amount of light incident on that sensor. This voltage output is maximum when the orientation of the blinds 10 is parallel with the direct rays of the sun and falls to a minimum when the blinds 10 are closed in either direction, forming a bell-shaped relationship between voltage output and window blind angle (fenestration angle). A typical response of the voltage output of sensor 14 as the blinds 10 are moved is shown in FIG. 4. For this response, the blinds 10 were moved 180 degrees from the fully closed position with the outside blind edges pointing down, through horizontal, and into the fully closed position with the blind outside edges pointing upward. The essential feature of this response is that the blinds 10 admit the maximum amount of direct solar radiation at the angle that produces the maximum voltage at the inner sensor 14.

The magnitude of the peak voltage and the corresponding blind angle (fenestration angle) vary over time in response to the position of the sun in the sky and are affected by the orientation and geographical location of the window installation as well as by transient cloud cover. In order to maximize the direct solar gain through the window, the blinds 10 must be adjusted in angle to find and remain at the peak voltage of the curve of FIG. 4. This maintains a blind angle always equal to the solar zenith angle and allows maximum influx of direct beam radiation for the winter mode.

Figure 5:
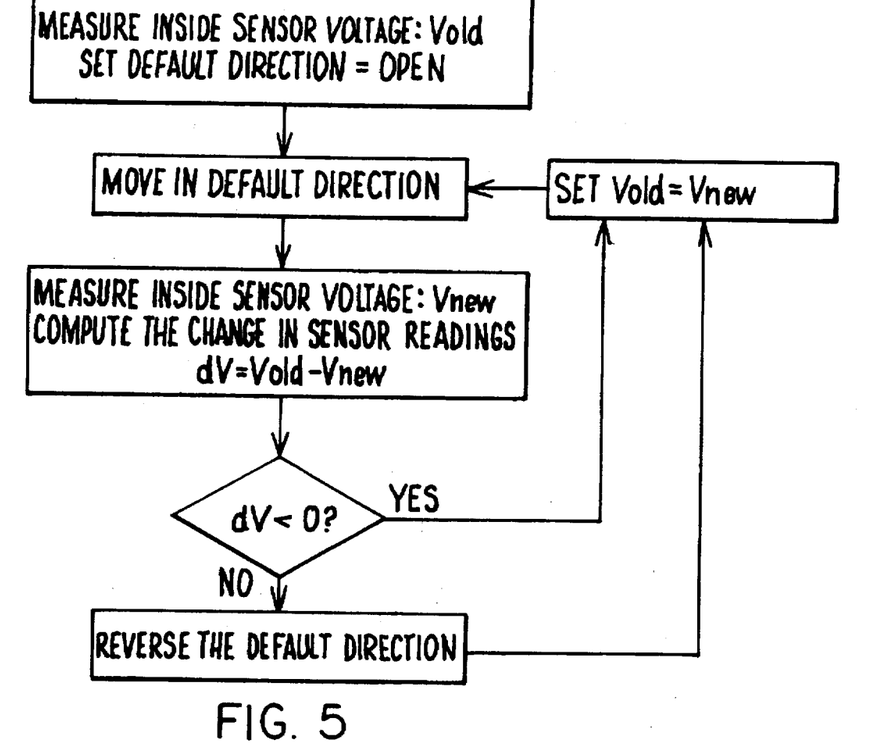
FIG. 5 is a schematic illustration of the control logic for the winter mode of the window energy control system of FIG. 1.

The control law or logic for the winter mode of operation is shown schematically in FIG. 5. The voltage output of the inner sensor 14 is converted and read by the control device CPU, and the blinds 10 are adjusted by a selected incremental angle in a predetermined direction, clockwise or counterclockwise. A second voltage output of the inner sensor 14 is read in like manner by the control device CPU after the incremental angle adjustment of the blinds 10. If the second voltage output reading is less than the first voltage output reading, the blinds 10 have been adjusted in the wrong direction. The control device CPU commands the motor 16 to reverse the direction of angular movement of the blinds 10, and the voltage output of sensor 14 is read in repeated manner as the blinds 10 are moved in small angular increments (e.g. degrees) by the control device CPU. The blinds 10 are moved in angular increments until the change in the output voltage of sensor 14 becomes very small or begins to decrease. This change indicates that the maximum amount of sunlight is entering the window, and that the blinds 10 are in the peak position of the voltage curve of FIG. 4.

For a summer mode of operation, the blinds 10 are positioned so that the direct rays of the sun are completely blocked, while the blinds are opened as much as possible to allow entry of diffuse outside illumination to maximize natural lighting. In this mode, the voltage output of both sensors 12, 14 is converted and read or determined by the control device CPU. The blind angle is varied to achieve a predetermined, fixed ratio of the output voltage of the outer sensor 12 to output voltage of the inner sensor 14. This ratio is dependent upon the size and type of sensors 12, 14 used, but is not dependent on the orientation and window installation site. In the energy control system of FIG. 1, this ratio was selected to be 2.75 for given system hardware selected, such as particular photocell, motor, gearing, glass type, etc. based on empirical performance data of the system hardware, although the invention is not limited to any particular value for ratio.

Figure 6:
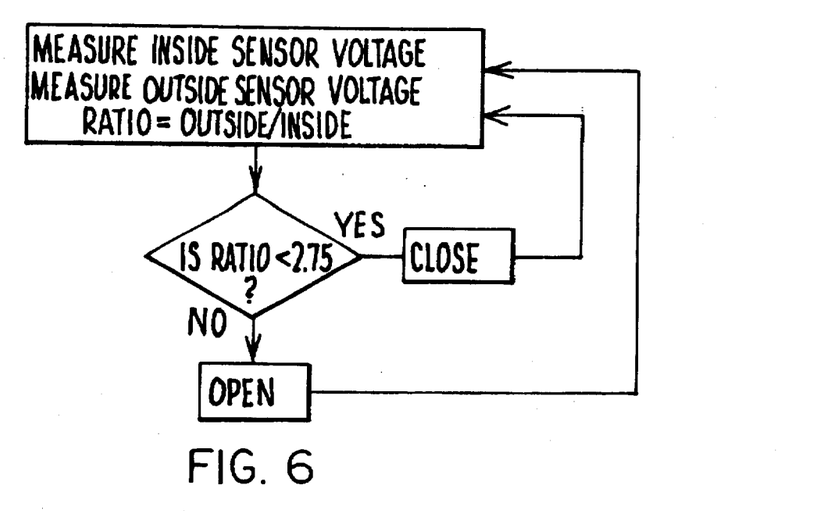
FIG. 6 is a schematic illustration of the control logic for the summer mode of the window energy control system of FIG. 1.

The control law or logic for the summer mode of operation is shown in FIG. 6. The voltage outputs of the outer and inner sensors 12, 14 are converted and read by the control device CPU and their ratio is calculated by the CPU. This computed ratio is used as a set point; i.e. if the computed ratio is too high, the blinds 10 are moved incrementally (e.g. 2 degrees) opened, allowing more light to strike the inner sensor 14 and lower the ratio. If the ratio is too low, the blinds 10 are moved incrementally in the closed direction to reduce the light stiking the sensor 14 and increase the ratio.

Under conditions of low light, such as present in the early morning or late evening, a lower threshold value for the voltage on the current regulated photovoltaic power supply 30 is reached. In response, the microprocessor control device CPU commands the electrical motor 16 to close the fenestration blinds 10. Thus, the fenestration shades or blinds remain closed during the night to provide privacy, security, and reduce radiative heat loss during the winter.

Figure 7A:
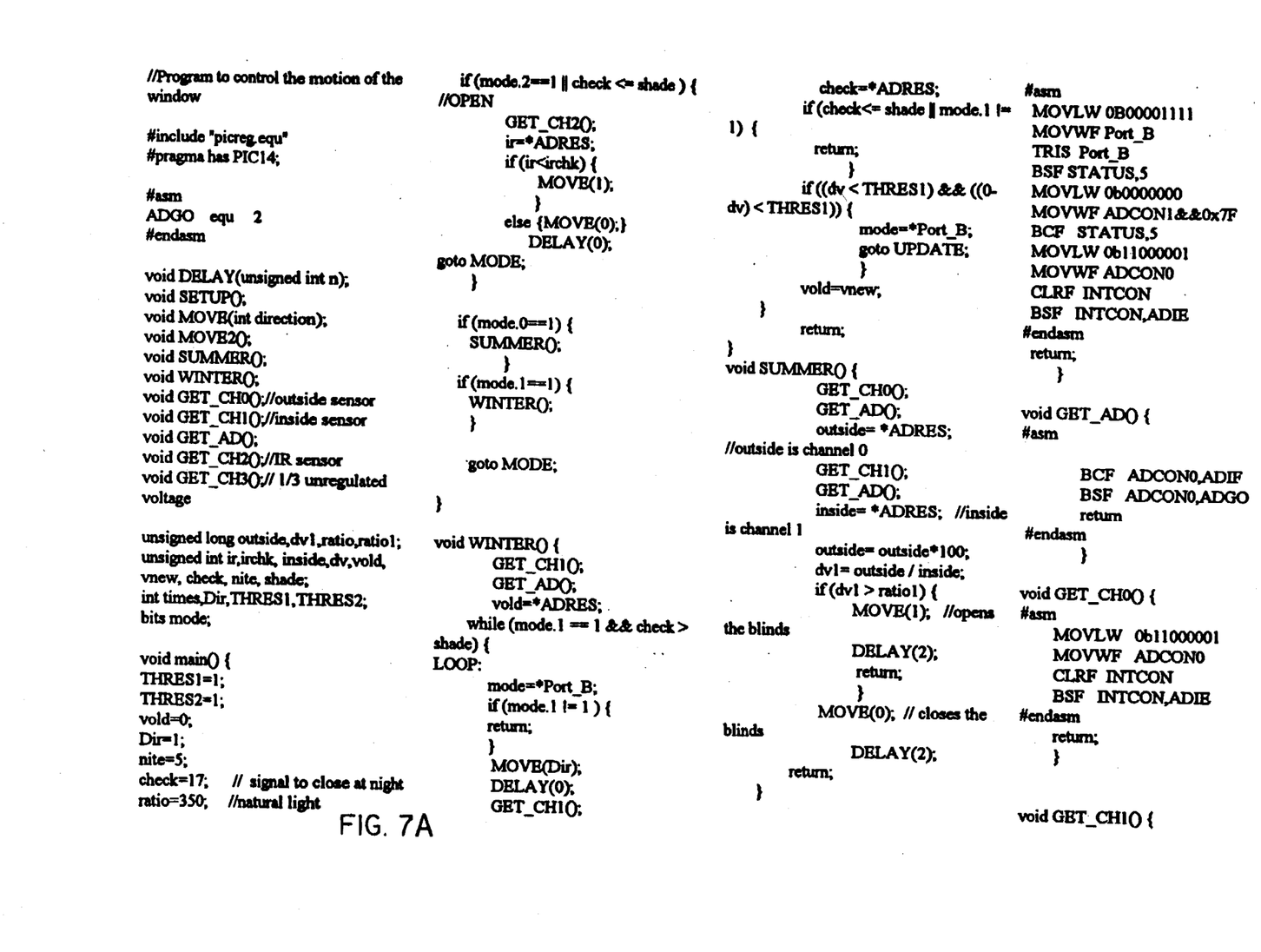
FIG. 7 is a schematic illustration of the control logic program of the window energy control system of the invention.
Figure 7B:
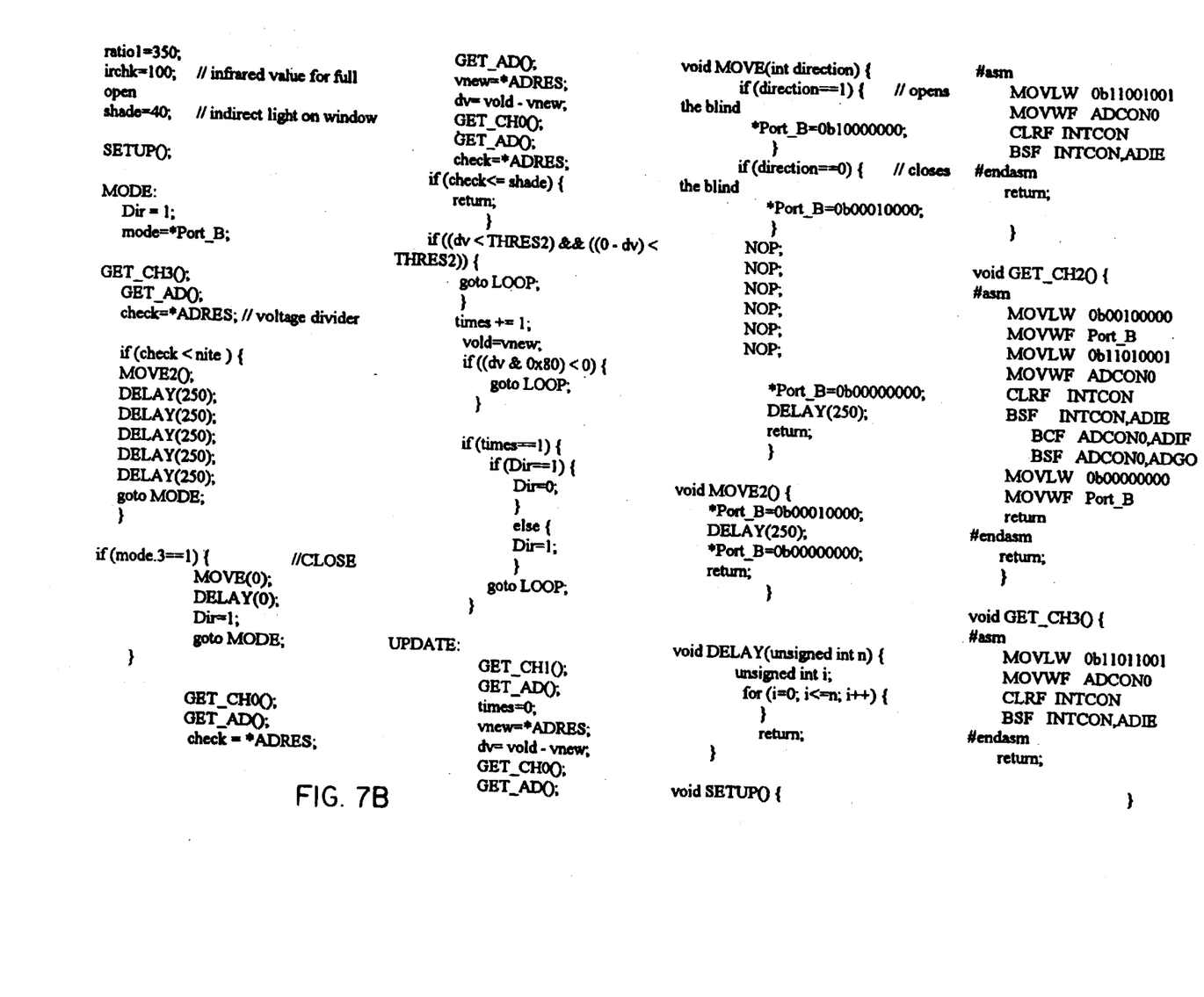

FIG. 7 sets forth the logic control program by which the microprocessor control device CPU is programmed for automatic control of the window in the manner described herebove.

The energy control system described hereabove was tested at the Mobile Window Thermal Test Facility (MoWiTT) located at Reno, Nev., and operated by the Lawrence Berkeley Laboratory of the U.S. Department of Energy. In addition, computer simulations were developed to forecast annual energy savings when the window energy control system is applied to actual in-use building conditions.

Figure 8:
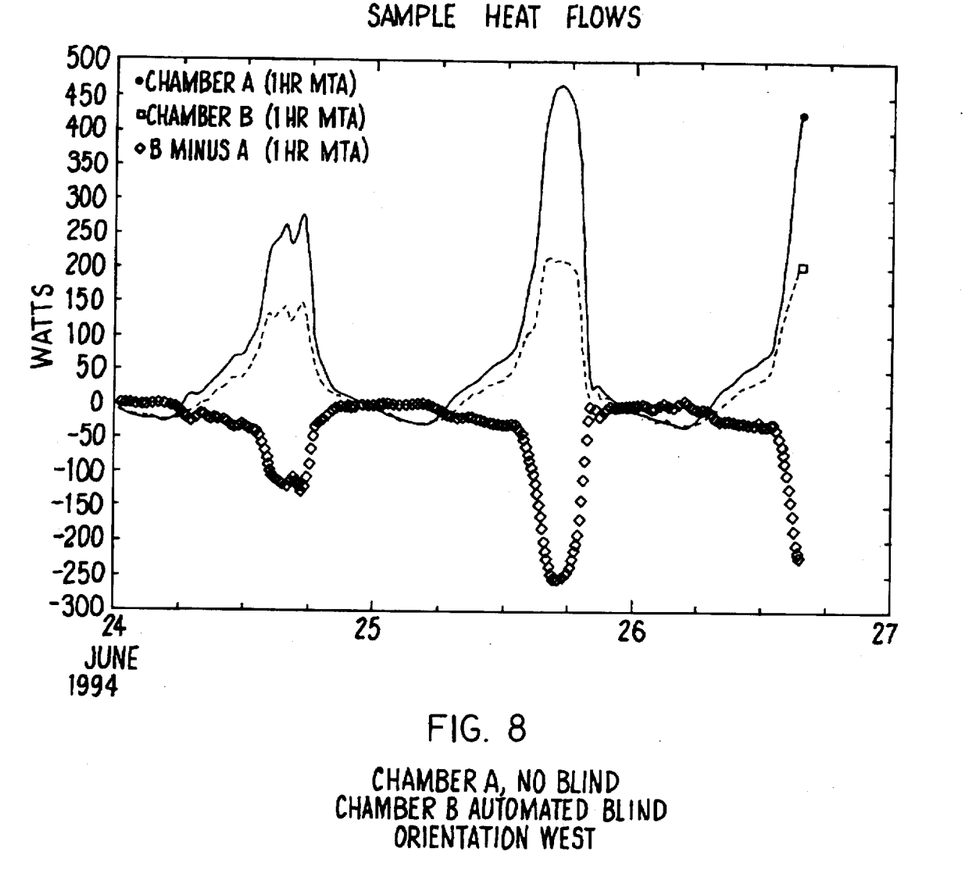
FIG. 8 is a graph of direct thermal transfer through identical windows facing west in two calibrated and continuously monitored test cells A and B wherein the window in test cell A had no blinds and the window in test cell B was equipped with the window energy control system of the invention.
Figure 9:
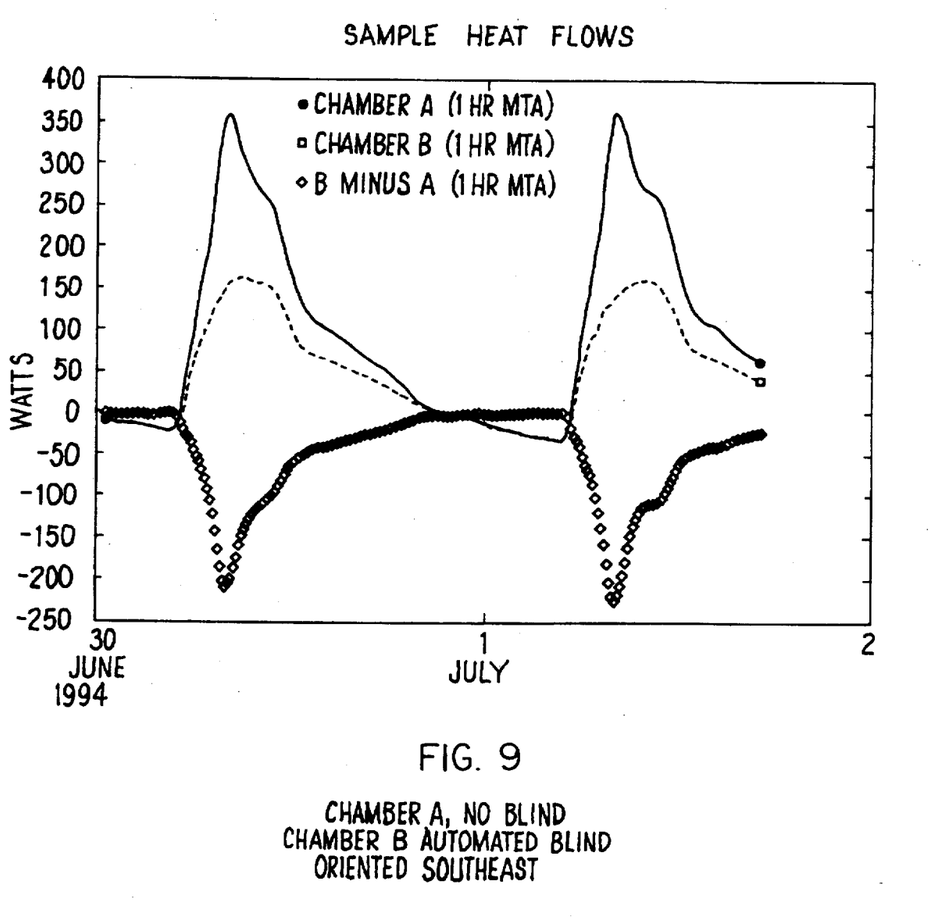
FIG. 9 is a graph of direct thermal transfer through identical windows facing southeast in two calibrated and continuously monitored test cells A and B wherein the window in test cell A had no blinds and the window in test cell B was equipped with the window energy control system of the invention.

FIGS. 8 and 9 illustrate direct thermal transfer through identical windows in two calibrated and continuously monitored, measured test cells at MoWiTT. The window in test cell A was identical to that in test cell B except that it had the horizontal blinds 10 removed. Both windows were SLIMSHADE wood casement windows (window size of 0.743 meter by 1.05 meter) made by Pella Corporation, Pella, Iowa. However, the window in test cell B embodied the active blind control system described hereabove of the invention to actively control the angle of the horizontal blinds 10.

FIG. 8 illustrates sample heat flows with both test cells A and B oriented to the west, while FIG. 9 illustrates sample heat flows with both test cells A and B oriented to the southeast at the Reno site. In both orientations, the maximum heat flow is cut in half. Integrating the heat flow over the three days shows an average of 1.5 kW-hr of energy savings per day per square meter of window glass.

Figure 10:
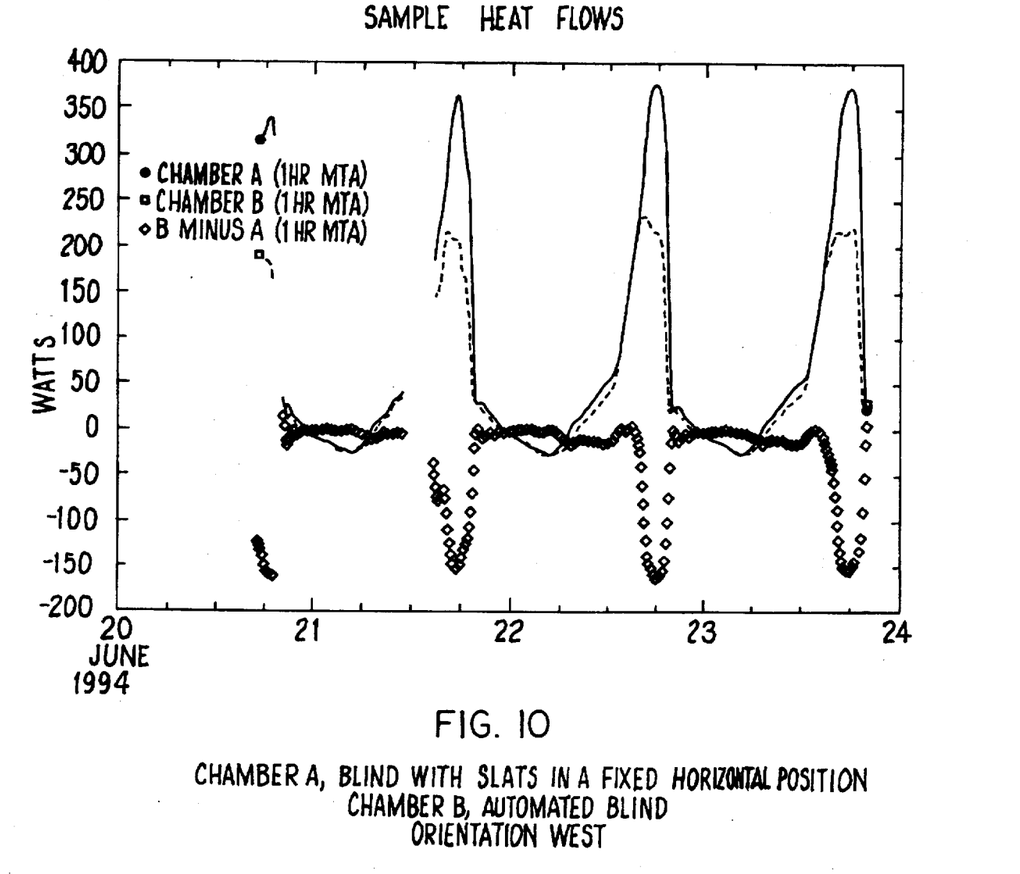
FIG. 10 is a comparison graph of direct thermal transfer through identical windows facing west in two calibrated and continuously monitored test cells A and B wherein the window in test cell A had horizontal blinds in a fixed, open position and the window in test cell B was equipped with the window energy control system of the invention.

Further tests were conducted with the window in test cell A fitted with horizontal blinds 10 which were not actively adjusted, but instead were fixed in a horizontal, open position. FIG. 10 illustrates sample heat flow comparisons between the windows of these test cells A and B oriented to the west. This data shows 75% of the energy savings over the open window trial, and the active windows of the invention still save 0.8 kW-hr energy over the course of an average day per square meter of window glass.

Computer simulations demonstrated energy saving potentials of 80,000 to 100,000 Btu per square foot of window surface area per year when the active window control system described hereabove is employed. These data were corroborated by the MoWiTT tests and are reliable for buildings located near 42 degrees North latitude. For locations increasing in North latitude, savings will diminish because of decreasing annual cooling load reductions and because approximately 80% of active window energy savings are attributable to cooling load reductions. Conversely, as locations move toward the equator, computer simulations predict that total energy savings will increase 1.20% for each degree of latitude moved toward the equator. Buildings located near 20 degrees North latitude, or South Latitude, and with comparable annual sunshine hours to the central U.S. should realize energy savings of 100,000 to 125,000 Btu per square foot of glazing per year from the use of the energy control system described hereabove. These energy savings relate to direct thermal transmittance alone, and do not take into account further savings from reduced electrical power consumption as a result of improved management of daylighting.

Although the invention has been described with respect to the shades or blinds 10 disposed between the panes of a double-pane window, the invention is not so limited since the shades or blinds can be disposed at other locations relative to the window panes, and the window can be a multi-pane or a single pane window. Moreover, although the invention has been described with respect to certain specific embodiments thereof, those skilled in the art will recognize that these embodiments were offered for purposes of illustration rather than limitation and that the invention is not limited thereto but rather only as set forth in the appended claims.

We claim:

1. Energy control system for a window, comprising:
   a) fenestration shade means disposed at the window and adjustable about an angle to control solar radiation entering the window, said fenestration shade means having an exterior side facing outwardly of said window and an interior side facing inwardly of said window,
   b) first light sensor means disposed proximate the exterior side of said fenestration shade means for providing a signal over time representative of changing incident solar radiation at said exterior side,
   c) second light sensor means disposed proximate the interior side of said fenestration shade means for providing a signal over time representative of changing incident solar radiation at said interior side,
   d) electrical motor means operably connected to said fenestration shade means for controlling the angle thereof, and
   e) microprocessor control means for providing control signals to said electrical motor means to automatically adjust said angle of said fenestration shade means in response to the signals of the first and second light sensor means which signals vary due to changes in incident solar radiation over time, said control means comparing a ratio of said signals and a preset ratio of said signals and providing said control signals to said electrical motor means to adjust said angle until the ratio of said signals approximates said preset ratio.

2. The system of claim 1 wherein said fenestration shade means comprises a plurality of horizontal, angularly adjustable blinds disposed between a top and bottom of said window.

3. The system of claim 1 wherein said fenestration shade means comprises a plurality of vertical, angularly adjustable blinds disposed between opposite sides of said window.

4. The system of claim 1 wherein said first light sensor comprises a photovoltaic sensor disposed proximate said exterior side to receive incident sunlight.

5. The system of claim 1 wherein said second light sensor means comprises a photovoltaic sensor disposed proximate said interior side to receive incident sunlight.

6. The system of claim 1 wherein said electrical motor means is disposed proximate said window.

7. The system of claim 1 wherein said electrical motor is operably connected to a support rail of said fenestration shade means so as to rotate said rail.

8. The system of claim 7 wherein further including a gear reducer between said motor means and said suport rail.

9. The system of claim 7 further including a rotational sensor on said rail to provide a reference signal to said control means representative of a full open position of said shade means.

10. The system of claim 1 wherein said electrical motor is a stepping motor that adjusts said angle in preset increments.

11. The system of claim 1 wherein said microprocessor control means comprises a microprocessor having an analog to digital converter to convert analog signals from said first and second light sensor means to digital signals and a calculated ratio representative of solar radiation incident at said exterior side and interior side.

12. The system of claim 1 further including a first current regulated photovoltaic power supply disposed proximate said exterior side for supplying electrical power to said control means.

13. The system of claim 12 wherein said microprocessor control device commands said motor means to close said fenestration shade means when incident solar radiation on said first current regulated photovoltaic power supply falls below a threshold level.

14. The system of claim 12 further including a second photovoltaic power supply disposed proximate said exterior side for supplying electrical power to said electrical motor means.

15. The system of claim 14 wherein said second photovoltaic power supply charges a capacitor that supplies electrical power to said electrical motor means.

16. Energy control system for a window, comprising:
   a) fenestration shade means disposed at the window and adjustable about an angle to control solar radiation entering the window, said fenestration shade means having an exterior side facing outwardly of said window and an interior side facing inwardly of said window, b) light sensor means disposed proximate the interior side of said fenestration shade means for providing a signal over time representative of changing incident solar radiation at said interior side, c) electrical motor means operably connected to said fenestration shade means for controlling the angle thereof, and d) microprocessor control means for providing control signals to said electrical motor means to automatically adjust said angle of said fenestration shade means in response to the signal of the light sensor means which signal varies due to changes in incident solar radiation over time, said control means comparing said signal and a preset signal and providing said control signals to said electrical motor means to adjust said angle of said fenestration shade means until said signal approximates said preset signal.

17. The system of claim 16 wherein said preset signal corresponds to a fenestration angle generally equal to the solar zenith angle such that the fenestration shade angle closely approximates said solar zenith angle.

18. The system of claim 16 wherein said fenestration shade means comprises a plurality of horizontal, angularly adjustable blinds disposed between a top and bottom of said window.

19. The system of claim 16 wherein said fenestration shade means comprises a plurality of vertical, angularly adjustable blinds disposed between opposite sides of said window.

20. The system of claim 16 wherein said light sensor means comprises a photovoltaic sensor disposed to receive incident light.

21. The system of claim 16 wherein said electrical motor means is disposed proximate said window.

22. The system of claim 16 wherein said electrical motor is operably connected to a support rail of said shade means so as to rotate said rail.

23. The system of claim 22 further including a gear reducer between said electrical motor and said suport rail.

24. The system of claim 22 further including a rotational sensor on said rail to provide a reference signal to said control means representative of a full open position of said fenestration shade means.

25. The system of claim 16 wherein said electrical motor is a stepping motor that adjusts said angle in preset increments.

26. The system of claim 16 wherein said control means comprises a microprocessor having an analog to digital converter to convert analog signal from said light sensor means to digital signals.

27. The system of claim 16 further including a first current regulated photovoltaic power supply disposed proximate said exterior side for supplying electrical power to said control means.

28. The system of claim 27 wherein said microprocessor control device commands said motor means to close said fenestration shade means when incident solar radiation on said first current regulated photovoltaic power supply falls below a threshold level.

29. The system of claim 16 further including a second photovoltaic power supply disposed proximate said exterior side for supplying electrical power to said electrical motor means.

30. The system of claim 29 wherein said second photovoltaic power supply charges a capacitor and/or a battery that supplies electrical power to said electrical motor means.

* * * * *